Sept. 15, 1953 C. J. HIRSCH 2,652,194

ELECTRICAL COMPUTER

Filed March 2, 1948 7 Sheets-Sheet 1

INVENTOR.
CHARLES J. HIRSCH

BY John A. Harvey
ATTORNEY

*INVENTOR.*
CHARLES J. HIRSCH
BY *John A. Harvey*
ATTORNEY

Sept. 15, 1953 C. J. HIRSCH 2,652,194

ELECTRICAL COMPUTER

Filed March 2, 1948 7 Sheets-Sheet 3

INVENTOR.
CHARLES J. HIRSCH
BY John A. Harvey
ATTORNEY

INVENTOR.
CHARLES J. HIRSCH
BY John A. Harvey
ATTORNEY

Sept. 15, 1953 C. J. HIRSCH 2,652,194

ELECTRICAL COMPUTER

Filed March 2, 1948 7 Sheets-Sheet 5

INVENTOR.
CHARLES J. HIRSCH

BY John A. Harvey

ATTORNEY

*INVENTOR.*
CHARLES J. HIRSCH
*BY* John A. Harvey
ATTORNEY

ELECTRICAL COMPUTER

Filed March 2, 1948 7 Sheets-Sheet 7

*INVENTOR.*
CHARLES J. HIRSCH

BY John A. Harvey

ATTORNEY

Patented Sept. 15, 1953

2,652,194

UNITED STATES PATENT OFFICE 2,652,194

ELECTRICAL COMPUTER

Charles J. Hirsch, Douglaston, N. Y., assignor to Hazeltine Research, Inc., Chicago, Ill., a corporation of Illinois Application March 2, 1948, Serial No. 12,633

20 Claims. (Cl. 235—61)

Figure 1:
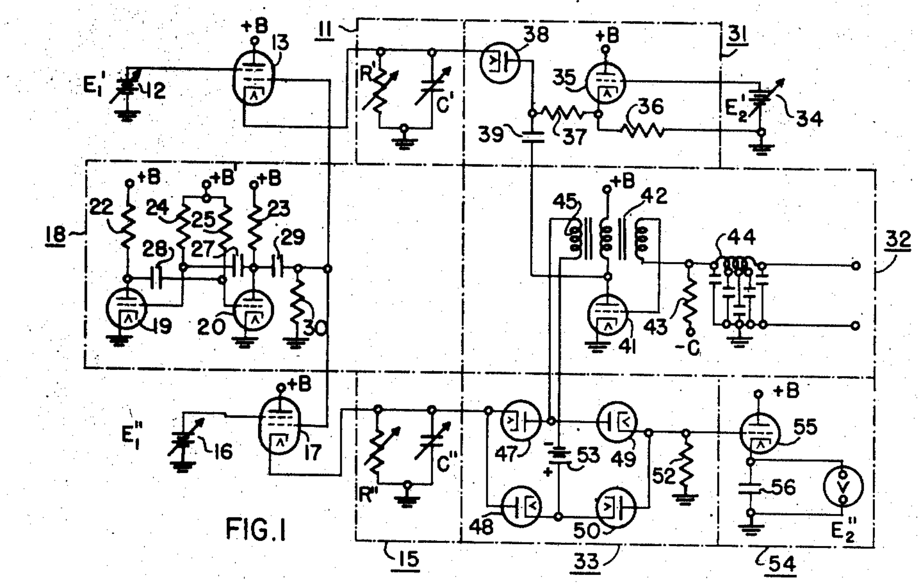

This invention relates to an electrical computer for solving equations involving known and unknown parameters. A great many relationships may be expressed in the form of such equations, in which the known parameters include one or more independent variables, some of which may be assigned constant values in a particular case, and in which the unknown parameter is the dependent variable.

One general type of prior art computer, which may be referred to as a digital computer, includes relay machines, punch-card machines, and adding and multiplying machines utilizing either mechanical or electronic counting devices. These computers can handle numerical data after the problem has been reduced to a numerical routine susceptible to solution by digital methods, which often requires extensive programming of the operation of the machine. The accuracy usually is limited only by the number of places to which a computation is carried out, but the machine may have to perform a very extensive counting operation to solve even a simple algebraic expression. Computers of this type tend to be bulky and cumbersome in operation, particularly when the problem is at all complex.

Another type of prior art computer may be classified generally as a continuously variable computer. These computers deal with quantities by continuous correlation with mechanical displacements or electrical effects. Tachometer instruments come under this classification. Another example of this type of computer is the resolver, in which a primary winding carrying a voltage the amplitude of which represents a vector is coupled to two secondary windings on a rotor mechanism. The rotor is moved in such a way that the coupling of the primary winding to these two secondary windings varies as the sine and cosine respectively of the angular direction of the vector. Thus the amplitudes of the voltages induced in the two secondary windings may represent respectively the components of the vector as projected on the axes of a system of Cartesian co-ordinates.

Compared with digital computers, the continuously variable computers usually have the advantage of high speed and facility of setting up the computer to solve a given problem, but have the disadvantage that their accuracy tends to be lower. In order to provide a computer of the continuously variable type to solve a particular problem, it is necessary to find an effect which can be made to follow the independent variables involved in the problem continuously with proper tracking and without objectionable backlash or time lag effects. Much ingenuity has been exercised to devise mechanical, electrical, or electromechanical devices suitable for accomplishing these purposes and for providing a useful indication of the result of the computation. In general, however, each such computer can be used to solve only a very restricted form of problem, and hence usually is permanently coupled mechanically or electrically to the source of the independent variable involved in the computation. This specialization of function, dictated by the special nature of the mechanical or electrical devices utilized in the computer, makes the continuously variable computers of limited usefulness in the solution of the mathematical problems or algebraic expressions most frequently encountered.

Accordingly, it is an object of the present invention to provide a new and improved electrical computer which substantially avoids one or more of the limitations and disadvantages of prior arrangements of the type described.

It is also an object of the invention to provide a new and improved electrical computer applicable generally for solving equations the solutions of which involve the common mathematical relationships.

It is a further object of the invention to provide a new and improved electrical computer free of mechanical moving parts, compact and of small weight, yet capable of computations at high speeds.

It is a still further object of the invention to provide a new and improved electrical computer capable of continuously and rapidly recalculating a problem involving parameters subject to changes.

It is still another object of the invention to provide a new and improved electrical computer for performing algebraic operations in which all of the independent and dependent variables are represented by voltages referred to a convenient reference or datum voltage.

In accordance with the invention, an electrical computer for solving equations involving known and unknown parameters comprises an electrical reference circuit having circuit elements with resistance and reactance values so proportioned as to develop an electrical effect varying as a predetermined time function the value of which at some time represents a known parameter of an equation to be solved; a source of potential adjustable to a value representative of a parameter of said equation; and means for utilizing the adjustable potential and the effect at the the predetermined time to develop a control effect. The computer includes an electrical controlled circuit having circuit elements with resistance and reactance values so proportioned as to develop another electrical effect having a value electrically independent of the value of the first-mentioned effect and varying as a predetermined time function a value of which at some time is related to the value of an unknown parameter of the equation. The computer also includes means responsive to the control effect for evaluating the other effect to derive a resultant effect which represents an unknown parameter of the equation, and means for utilizing the resultant effect representative of the unknown parameter.

For a better understanding of the present invention, together with other and further objects thereof, reference is had to the following description taken in connection with the accompanying drawings, and its scope will be pointed out in the appended claims.

Figure 2:
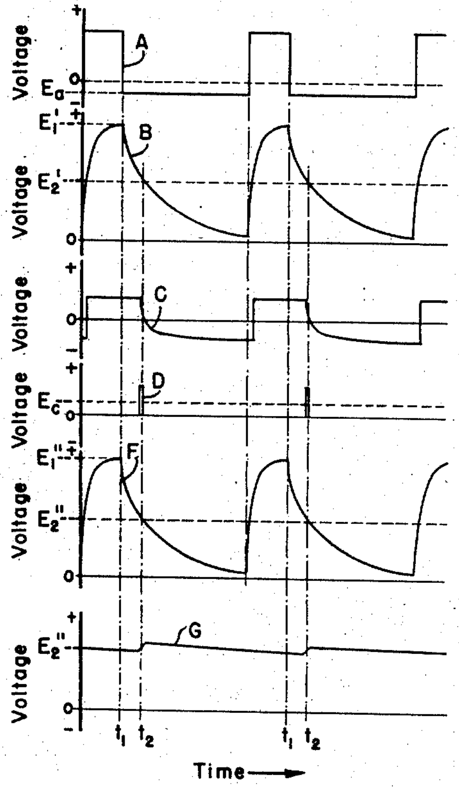
Figure 3:
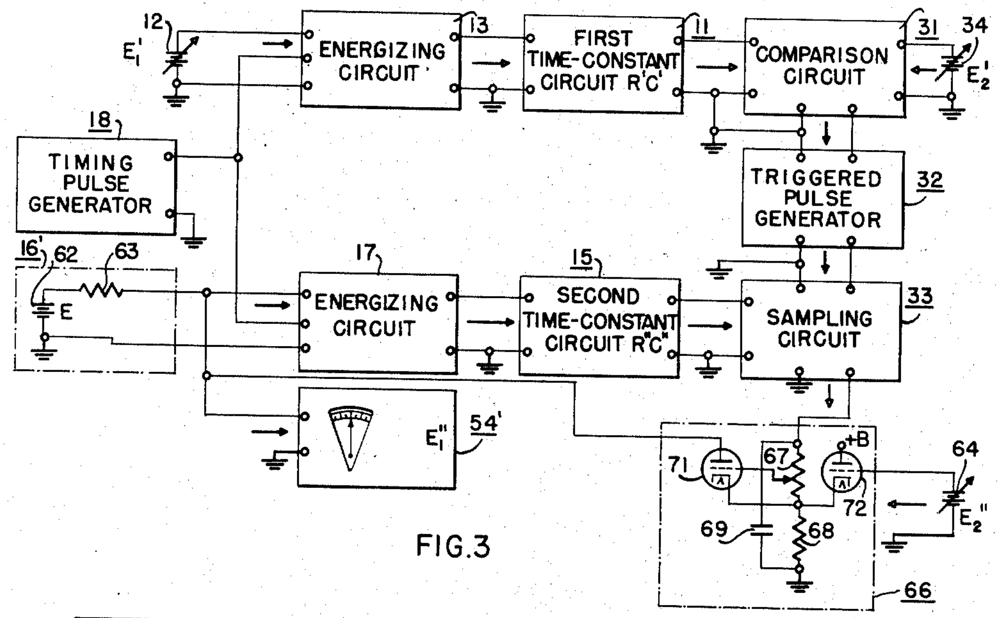

In the drawings, Fig. 1 is a circuit diagram of an electrical computer embodying the present invention; Fig. 2 is a graph utilized in explaining the operation of the Fig. 1 arrangement; Fig. 3 is a circuit diagram, partly schematic, of a modified form of the Fig. 1 arrangement which has a mode of operation also represented by the graphs of Fig. 2; Figs. 4, 6, 8, 10, 12, and 14 are circuit diagrams, partly schematic, of other embodiments of the invention; while Figs. 5, 7, 9, 11, 13, and 15 are graphs utilized in explaining the operation of the last-mentioned modified forms of computer.

Referring to Fig. 1 of the drawings, there is shown a circuit diagram of an electrical computer for solving equations involving known and unknown parameters and particularly well adapted for performing the mathematical operation of raising a number to a power either greater or less than unity. The computer comprises a plurality of circuits in the form of energy-storage networks each effective upon energization to produce a measurable effect having a value which is a predetermined function of time, the known and unknown parameters being represented by values assumed by the time functions of these effects at related times. One of these networks is a reference circuit 11 comprising a shunt combination of an adjustable resistor R′ and an adjustable condenser C′. This network is effective to develop a voltage effect varying as a predetermined function of time, specifically an exponential decay-time function, the value of which at some time represents a known parameter. The voltage effect developed across the network 11 has a value which is solely dependent upon the value of the initial voltage applied to the network and the predetermined time-constant characteristic thereof. The energization of the network 11 is controlled by a source of voltage $E_1'$, in the form of an adjustable battery 12 which is coupled to an outer control electrode of an energizing-circuit vacuum tube 13 the anode of which is connected to a source of space current indicated as +B. The cathode circuit of the tube 13 includes the network 11.

The computer also includes another energy-storage network 15 comprising an adjustable resistor R′′ and shunt-connected adjustable condenser C′′. This network is effective upon energization thereof, at a time related to the time of the energization of the reference circuit 11, to develop another voltage effect having a value electrically independent of the value of the first-mentioned effect and varying as a predetermined exponentially decaying time function. In a manner similar to that mentioned above in connection with the network 11, the voltage effect developed across the network 15 has a value which is solely dependent upon the value of the initial voltage applied to the last-mentioned network and the predetermined time-constant characteristic thereof. Therefore, the value of the effect developed in either network 11 or 15 is electrically independent of the value of the effect developed in the other network. The energization of the network 15 also is controlled by a source of a voltage $E_1''$, in the form of an adjustable battery 16, coupled to another energizing-circuit vacuum tube 17. This vacuum tube has an outer control electrode to which the battery 16 is coupled and an anode which is energized from a space-current source +B. The cathode circuit of the tube 17 includes the network 15.

A timing-pulse generator 18 is provided for repeatedly energizing both the reference network 11 and the controlled network 15. The unit 18 is a multivibrator having two vacuum tubes 19 and 20 coupled to a source of space current, indicated as +B, through respective anode resistors 22, 23. The control electrodes of the tubes 19, 20 are connected to a source of potential, indicated as +B′, through respective resistors 24, 25 and the control electrode of each tube is coupled to the anode of the other through respective condensers 27 and 28. The anode of the tube 20 is coupled through a condenser 29 to a resistor 30 and to the inner control electrodes of the two energizing tubes 13 and 17.

The computer arrangement also includes means responsive to the value of the effect developed in the reference network 11 at a particular time after each of the repeated energizations thereof for evaluating the other effect developed in the network 15 to derive an effect which represents an unknown parameter. This means comprises a comparison circuit 31 coupled to the network 11 and a triggered pulse generator 32 having an input circuit coupled to the comparison circuit 31 and having an output circuit coupled to an input circuit of a sampling circuit 33. The sampling circuit also has an input circuit coupled to the controlled network 15.

The comparison circuit 31 is provided with a source of voltage $E_2'$ in the form of an adjustable battery 34. The comparison circuit 31 also includes a tube 35 having a cathode-load resistor 36. The control electrode of the tube is connected to the battery 34, while the anode is connected to a source of space current +B. The cathode of the tube 35 also is coupled through a resistor 37 to the anode of a diode vacuum tube 38 the cathode of which is coupled to the network 11. The anode of the tube 38 is coupled through a condenser 39 to the anode of a vacuum tube 41 in the pulse generator 32.

The pulse generator 32 is of the blocking oscillator type. The anode of the tube 41 is coupled through one winding of a transformer 42 to a source of space current +B. Another winding of the transformer 42 has one terminal connected to the control electrode of the tube 41 and the other terminal coupled through a resistor 43 to a source of biasing potential indicated as —C. The resistor 43 also is connected to a pulse-forming delay line 44 the remote terminals of which are open-circuited. If the output signal from the comparison circuit 31 has insufficient magnitude, a pulse amplifier may be inserted between the condenser 39 and the anode of tube 41.

The sampling circuit 33 is of the bridge-rectifier type and comprises four diode vacuum tubes 47, 48, 49, 50 arranged in a conventional bridge-rectifier circuit. One pair of diagonal terminals of this bridge circuit is connected between the network 15 and a grounded resistor 52. The other pair of diagonal terminals of the bridge is connected to an actuating circuit comprising an output winding 45 provided on the transformer 42 of the unit 32. The actuating circuit also includes in series with the winding 45 a source of bias potential 53.

For utilizing the effect representative of the unknown parameter, this effect being a voltage $E_2''$ derived across the resistor 52, there also is provided a vacuum-tube voltmeter 54. This voltmeter includes a vacuum tube 55 having a control electrode coupled to the resistor 52 and an anode connected to a source of space current +B. The cathode circuit of the tube 55 comprises a condenser 56 across which is connected a voltmeter V for reading the voltage $E_2''$. The capacitance of condenser 56 and the resistance of the voltmeter V have values so selected as to provide for the latter element a suitably large time constant.

The operation of the computer just described will now be described with reference to the curves of Fig. 2. The timing-pulse generator 18 operates in a conventional manner to generate across the resistor 30 a series of timing pulses of negative polarity represented by curve A of Fig. 2. In the computer described, these pulses repeat at a regular rate, and the time of starting of one such negative pulse is identified by the time $t_1$. These negative pulses are applied to the inner control electrodes of the energizing tubes 13 and 17. The pulses have a magnitude $E_a$ sufficient to cause these tubes to become and remain nonconductive for the duration of the negative timing pulses regardless of the voltages which may be applied to the outer control electrodes of tubes 13 and 17 and even when the voltages developed across the networks 11 and 15 are quite small. Prior to the start of each negative timing pulse, the inner control electrodes of the tubes 13 and 17 have a positive pulse applied thereto from the generator 18 and thus permit the flow of space current through the respective networks 11 and 15. In the case of the network 11, the condenser C' is charged up to and maintained at the voltage $E_1'$ of the battery 12 by virtue of the well-known cathode-follower mode of operation of the tube 13. At the time $t_1$ when the tube 13 is effectively disconnected from the network 11 by being biased to anode-current cutoff as above explained, the condenser C' commences to discharge exponentially through the resistor R' in the manner represented by curve B of Fig. 2.

Meanwhile, the tube 35 also operating as a cathode follower develops across its cathode-load resistor 36 a voltage $E_2'$ equal to that applied to the control electrode of the tube 35 from the battery 34. Thus, the difference voltage between the voltage of the network 11 and the voltage developed across the cathode resistor 36 appears across the series combination of the resistor 37 and the diode 38. When the voltage across the network 11 drops just below the voltage $E_2'$ appearing across the resistor 36, the diode 38 conducts to develop across the resistor 37 a pulse of voltage having negative polarity. This latter voltage is applied through the condenser 39 to the pulse generator 32 at a time $t_2$, as represented by curve C of Fig. 2. The leading edge of this pulse at the time $t_2$ initiates the generation of a single potential pulse of short duration in the pulse generator 32. The duration of the pulse thus generated in unit 32 is determined by the time required for a negative pulse to be reflected from the open end of the delay line 44 back to the control electrode of the tube 41, and this duration is chosen just great enough to provide for adequate sampling of the voltage present across the network 15 at and immediately after the time $t_2$.

The resulting pulse from the unit 32, represented by curve D of Fig. 2, is applied from the output winding 45 of the transformer 42 to the sampling circuit 33 with proper polarity and magnitude to overcome the biasing voltage $E_c$ of the source of potential 53. Accordingly, the bridge circuit 47, 48, 49, 50 is actuated and rendered conductive for the duration of the applied pulse with the result that the voltage then existing across the controlled network 15 appears across the resistor 52. The controlled network 15 is energized under control of the tube 17 in essentially the same manner as the network 11 is energized under control of the tube 13. Also, the network 15 is energized at the same time $t_1$ as is the reference network 11. Its voltage at the time of energization is the voltage $E_1''$ of the adjustable battery 16. The voltage wave form developed across the network 15 is represented by the curve F of Fig. 2. After energization at the time $t_1$, the exponential decay continues until, at the time $t_2$, the voltage across the network 15 has reached a value $E_2''$. It is at this time that the sampling circuit 33 is actuated, in a manner previously described, in response to the voltage $E_2'$ appearing in the network 11 so that the voltage developed across the resistor 52 of the sampling circuit also has the value $E_2''$. The voltmeter circuit 54 operates as a cathode follower and its condenser 56 is charged to the voltage $E_2''$. The resulting voltage $E_2''$ as measured by the voltmeter V is represented by the curve G of Fig. 2.

It is to be understood that the value $E_2''$ which the voltage across the network 15 reaches at time $t_2$ is dependent solely on the value $E_1''$ of the voltage initially applied to this network and the predetermined time-constant characteristic of the network 15. The values $E_2''$ and $E_2'$ are obtained electrically independently of one another, the circuit or network developing the one in no way affecting the circuit or network developing the other.

The manner in which the Fig. 1 arrangement is utilized to perform computations will be more fully apparent from the following mathematical analysis of its operation.

The voltage across the network 11 decays from the value $E_1'$ at time $t_1$ to the value $E_2'$ at time $t_2$ in accordance with the expression:

$$E_2' = E_1'' \epsilon^{-\frac{t_2 - t_1}{R'C'}} \tag{1}$$

where

R' = the value of resistance of the resistor R'
C' = the value of capacitance of the condenser C'

Likewise, the voltage across the network 15 decays during the same interval from the value $E_1''$ to the value $E_2''$ in accordance with the expression:

$$E_2''=E_1''\epsilon^{-\frac{t_2-t_1}{R''C''}} \quad (2)$$

where $R''$=the value of resistance of the resistor $R''$
$C''$=the value of capacitance of the condenser $C''$ The time constants of the networks 15 and 11 are related by the expression:

$$R''C''=\frac{R'C'}{n} \quad (3)$$

It can be shown that the simultaneous solution of Equations 1, 2 and 3 is given by the relation:

$$\frac{E_1''}{E_2''}=\left(\frac{E_1'}{E_2'}\right)^n \quad (4)$$

Thus, to solve an equation of the form:

$$y=x^n \quad (5)$$

it is necessary only to adjust the batteries 12 and 16 so that the voltages $E_1'$ and $E_1''$ are equal to unity on any suitable voltage scale. The Equation 4 then reduces to the form:

$$E_2''=(E_2')^n \quad (6)$$

The voltage $E_2''$ thereupon represents the parameter $y$ and the voltage $E_2'$ represents the parameter $x$ of Equation 5. As an example, let $x$ in Equation 5 equal 0.6, in terms of $E_1'=E_1''=1$, and $n$ equal 2.1. The time constant of the network 11 is given a value relative to the time constant of the network 15 by suitable adjustments of the values of the resistors R′, R″ and the condensers C′, C″ such that the ratio $n$ of the two time constants equals 2.1, to satisfy Equation 3 above. Battery 34 then is adjusted to make the voltage $E_2'$ equal 0.6 on the same scale on which the voltages of the batteries 12 and 16 were set to unity. The voltage $E_2''$, as read on the meter V, then is found to be 0.34 which is the value of the dependent-variable parameter $y$ of Equation 5.

Another method of using the arangement of Fig. 1, when $x$ in Equation 5 is greater than unity, lies in making a suitable choice for the value of $E_1''$ in Equation 4. This equation can be rewritten as follows:

$$E_2''=E_1''\left[\frac{E_2'}{E_1'}\right]^n \quad (7)$$

if then $E_1''$ is made equal to $(E_1')^n$, Equation 7 becomes:

$$E_2''=(E_2')^n \quad (8)$$

Thus, assume that $x$ in Equation 5 has a value of 5 and $n$ a value of 2.1. Further, let $E_1'=10$ volts so that $E_1''=10^{2.1}=126$ volts; then the voltage $E_2''$ as read on the meter V is found to be 29.5 volts which is the value of the dependent-variable parameter $y$ of Equation 5. The operation, expressed in a different manner, may be said to be that the voltage $E_1''$ having the initial value of 126 volts decays to the value $y=E_2''=29.5$ volts in the same time that the voltage $E_1'$ of initial value equal to 10 volts decays to $x=E_2'=5$ volts.

Proper attention to several details of design, readily apparent to those skilled in the art, suffices to give an indication of the desired solution of a mathematical equation within the limits of accuracy ordinarily desired. For example, the scales on which the voltages of the batteries 12, 16, and 34 are read may be compensated to take into account the fact that the voltages across the resistors R′, R″, and 36 at time $t_1$ may be slightly different than the voltages $E_1'$, $E_1''$, and $E_2'$, respectively. A further compensation of the voltage scale used in adjusting the battery 34 to the proper voltage may be desirable because of the slight difference in voltages between the voltage of the network 11 and the voltage across the resistor 36 required to cause the diode 38 to conduct. Likewise, the scale of the voltmeter V may be compensated to take into account the small voltage drops appearing across the rectifiers 47, 48, 49 and 50 of the sampling circuit 33 and the slight discrepancy due to the discharging of condenser 56 between cycles of computer operation. Also, in designing the sampling circuit 33 it may be desirable to neutralize carefully the reactances in the several arms of the bridge. The accuracy of computation is enhanced by so choosing the time constants of both of the networks 11 and 15 that the time $t_2$ at which the solution is derived occurs before the networks have become discharged to the flatter portion of their discharge curves. Similarly, the accuracy of computation is improved with increasingly larger values of the several reference voltages, thus minimizing stray voltage drops in the computer circuits.

In the first example given above of the solution of an equation of the form of Equation 5 the values of $x$ and hence of $y$ are less than unity, and this would be the case even though the power $n$ were less than unity. When the value of $x$ ands hence of $y$ in Equation 5 is greater than unity, regardless of the value of $n$, it is sometimes more convenient to use a circuit arrangement of the type shown in the partly schematic circuit diagram of Fig. 3.

Most of the circuit arrangement of Fig. 3 is the same as that of Fig. 1, elements which are the same as in Fig. 1 having the same reference numerals and similar elements having the same reference numerals primed. In the present embodiment, however, it is desired that the voltage $E_2''$ derived from the network 15 by the sampling circuit 33 be preset to a desired value, such as unity, representing an independent-variable parameter so that the voltage $E_1''$ to which the network 15 is charged initially must be adjusted to the value necessary to obtain the preset value of $E_2''$. Accordingly, there is included a source 16′ of voltage controllable to provide the requisite voltage $E_1''$.

The unit 16′ comprises a battery 62 having a voltage E and connected to an input circuit of the energizing circuit 17 through a voltage-dropping resistor 63. The resulting voltage $E_1''$ at the input circuit of the energizing circuit 17 is read on a voltmeter 54′.

There also is provided a source of voltage $E_2''$, in the form of an adjustable battery 64, and a control circuit 66 is included for adjusting the voltage $E_1''$ provided by the unit 16′. In the control unit 66, the voltage appearing across the output circuit of the sampling circuit 33 is developed across a tapped resistor 67 in series with a resistor 68. The resistors 67 and 68 together have such a high resistance that the rate of discharge of a condenser 69 connected across the two resistors in series is low. The unit 66 also includes two vacuum tubes 71 and 72, the cathodes of which are connected to the junction of resistors 67 and 68. The anode of the tube 71 is connected to the output circuit of the source 16′ while its control electrode is connected to the tap on the resistor 67. The anode of the tube 72 is connected to a source of space current +B, while its control electrode is connected to the battery 64.

When the computer illustrated in Fig. 3 is turned on, the voltage $E_2''$ of battery 64 appears across the cathode load 68 of the tube 72. Assuming that no space current is being drawn as yet by the tube 71, there is no voltage drop in the dropping resistor 63 and a high voltage E is applied to the energizing circuit 17. This results in a voltage derived in the sampling circuit and obtained across the condenser 69 which is greater than the voltage $E_2''$ across the resistor 68. This causes current to flow through the resistor 67, thus biasing the control electrode of the tube 71 to a positive voltage and permitting that tube to conduct and pass current through the resistors 63 and 68. The resulting voltage drop in the dropping resistor 63 thus increases during the first few cycles of computer operation until the voltage $E_1''$ becomes low enough that the voltage derived in the sampling circuit 33 practically equals the voltage $E_2''$, as desired.

As an example of the operation of the Fig. 3 arrangement to solve an equation of the form of Equation 5, reference again may be had to the curves of Fig. 2. It is necessary only to adjust the batteries 34 and 64 to that the voltages $E_2'$, curve B, and $E_2''$, curve F, are equal to unity. Equation 4 then reduces to the form:

$$E_1''=(E_1')^n \tag{9}$$

The voltage $E_1''$ thereupon represents the parameter $y$ and the voltage $E_1'$ represents the parameter $x$ of Equation 5. For example, let $x$ equal 1.6 and $n$ equal 2.1. As before, the time constants of the networks 11 and 15 are adjusted to make the ratio $n$ of the two time constants equal 2.1. Battery 12 then is adjusted to make the voltage $E_1'$ equal 1.6. The voltage $E_1''$, as read on the voltmeter 54', then is found to be 2.7 and indicates the value of the dependent-variable parameter $y$ of Equation 5. Curve G of Fig. 2 in this case represents the voltage developed across the condenser 69 of the control circuit 66.

By making suitable choice of the voltages $E_1'$, $E_2'$, $E_1''$, $E_2''$, and setting the value $n$ in Equation 4 equal to unity, it will be apparent that equations of various forms may be solved. For example, if the ratio $n$ is made unity and the voltage $E_1'$ of the Fig. 1 arrangement is adjusted to be unity, Equation 4 reduces to the form:

$$E_2''=E_1''E_2' \tag{10}$$

which accordingly may represent the parameters of the equation:

$$z=xy \tag{11}$$

When both of the parameters $x$ and $y$ are greater than unity, however, it is desirable to set $E_2'$ rather than $E_1'$ equal to unity and in this case the circuit arrangement of Fig. 3 should be used. Likewise, by making $E_2'$ equal to unity Equation 4 may be rearranged to the form in which it represents the parameters of an equation having the form:

$$z=\frac{x}{y} \tag{12}$$

Here again the Fig. 3 arrangement may be used if $y$ is less than unity, or Equation 4 may be changed to the form:

$$E_2''=E_2'/(E_1'/E_1'') \tag{13}$$

which is of the Equation 12 form wherein $$y=\frac{E_1'}{E_1''};\ x=E_2';\ \text{and}\ z=E_2''$$

Figure 4:
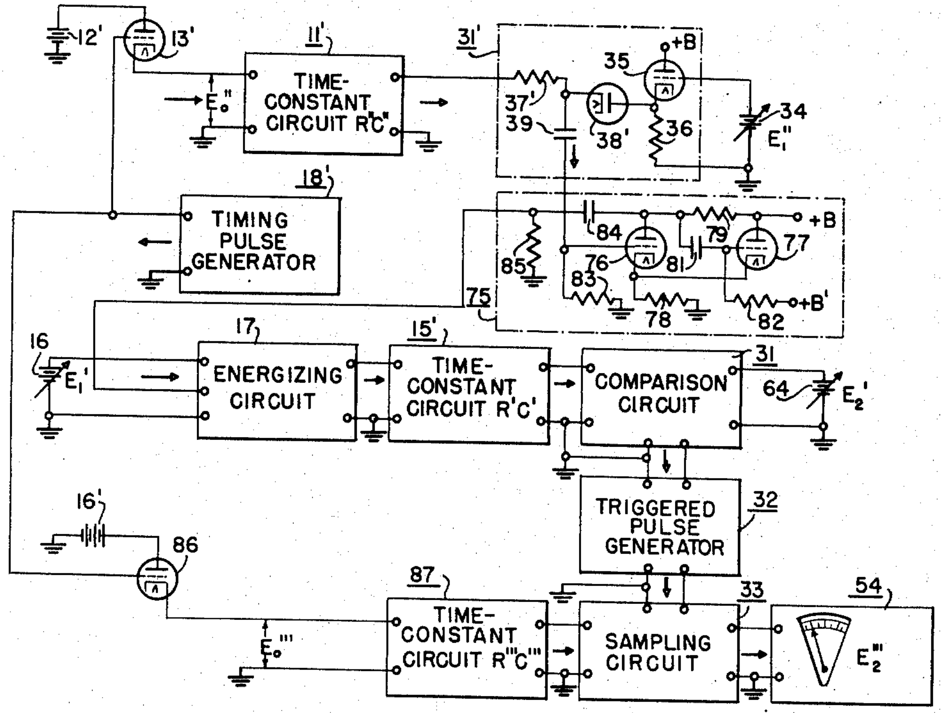
Figure 5:
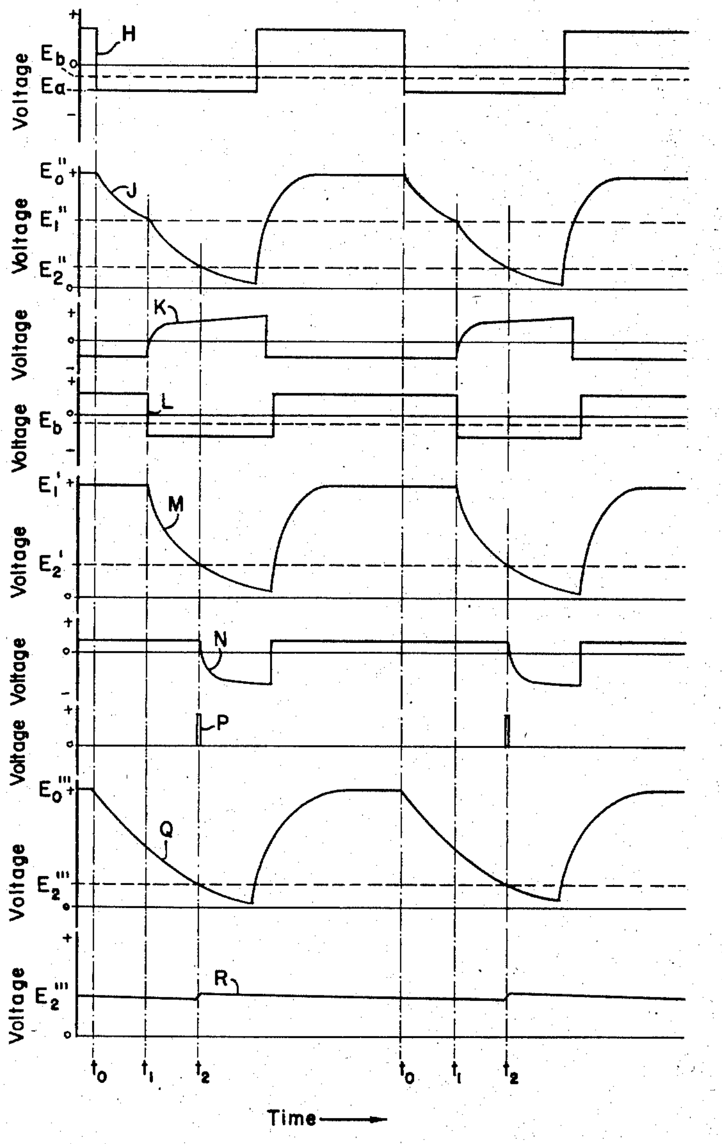

Fig. 4 is a partly schematic circuit diagram illustrating a modification of the Fig. 1 arrangement particularly suitable for the solution of equations of the form of Equation 10. A battery 12' is a source of an initial voltage preferably higher than any of the voltages representing parameters involved in the computation. The battery 12' is coupled to the anode of a triode vacuum tube 13', which is included in an energizing circuit for the unit 11' and has its control electrode coupled to the output circuit of the timing-pulse generator 18'. Referring to the curves of Fig. 5, illustrative of the operation of the Fig. 4 arrangement, a timing pulse of negative polarity delivered by the unit 18' is represented by curve H starting at the time $t_0$. Prior to this time the condenser C'' of the time-constant circuit R'', C'' of a circuit 11' has been charged to any suitable initial voltage $E_0''$. The circuit 11' then commences at time $t_0$ to discharge exponentially, as represented by curve J of Fig. 5.

The circuit 11' is coupled to a comparison circuit 31', which is similar to the comparison circuit 31 of Fig. 1 except that the resistor 37' and diode 38' of the circuit 31' occupy the places of the diode 38 and resistor 37, respectively, of the circuit 31 of Fig. 1. When the voltage of the time-constant circuit 11' falls just below the voltage $E_1''$ of the battery 34, a pulse of positive polarity is developed across the resistor 37' and is applied through a series condenser 39 and a shunt resistor 83 to the input circuit of a univibrator 75. The wave form of the pulse so applied is represented by curve K of Fig. 5. The time of commencement of this pulse is identified as $t_1$.

The univibrator 75 is of conventional design and includes two vacuum tubes 76, 77 having a common cathode resistor 78. The anode of the tube 76 is coupled to a source of space current +B through a load resistor 79 and is coupled to the control electrode of the tube 77 through a condenser 81. The latter control electrode is so biased as normally to cause space-current conduction in the tube 77. To this end, the control electrode of tube 77 is coupled to a source of biasing potential +B' through a resistor 82. The anode of the tube 77 is connected directly to the space-current source +B. When a positive pulse is applied by the unit 31' to the input circuit of the univibrator 75, the vacuum tube 76 is made conductive, and a pulse of negative polarity represented by curve L is derived at the anode of the tube 76 at the time $t_1$ and applied through a condenser 84 to a resistor 85 coupled across an input circuit of the energizing circuit 17. Another input circuit of the energizing circuit 17 is connected to a source of a voltage $E_1'$ in the form of an adjustable battery 16. The energizing circuit 17 serves to energize a time-constant circuit R', C' in a unit 15' which at time $t_1$ initiates an exponential discharge, represented by curve M of Fig. 5, starting at the voltage $E_1'$.

When the voltage of the circuit 15' falls to a value $E_2'$, as determined by the voltage $E_2'$ of an adjustable battery 64 controlling a comparison circuit 31, the comparison circuit derives a pulse of negative polarity represented by curve N. This pulse triggers the pulse generator 32 to provide a pulse of short duration having the wave form represented by curve P. The latter pulse is applied to actuate a sampling circuit 33.

Meanwhile the timing-pulse generator 18' has applied, at time $t_0$, a timing pulse of negative polarity to an energizing circuit 86 coupled to the battery 16'. By this means the voltage of an additional time-constant circuit R''', C''' of a unit 87 is brought to a value $E_0'''$ prior to the time $t_0$, at which time an exponential decay of the voltage across the circuit 87 commences as represented by curve Q. The sampling circuit 33 is coupled to the circuit 87 and at time $t_2$ is actuated, as described hereinabove, to derive in its output circuit the voltage $E_2'''$ represented by curve R of Fig. 5. This voltage is indicated on the voltmeter 54.

The manner in which the arrangement of Fig. 4 is utilized to perform computations will be more fully apparent from the following mathematical analysis of its operation.

Referring to curves J, M, and Q of Fig. 5, it will be apparent that:

$$E_1''=E_0''\epsilon^{-t_1/R''C''} \qquad (14)$$

$$E_2'=E_1'\epsilon^{-[t_2-t_1]/R'C'} \qquad (15)$$

$$E_2'''=E_0'''\epsilon^{-t_2/R'''C'''} \qquad (16)$$

Equation 16 may be evaluated by substituting in it the value of $t_2$ obtained from Equations 14 and 15. From Equation 14:

$$t_1=\log_\epsilon\left[\frac{E_0''}{E_1''}\right]^{R''C''} \qquad (17)$$

From Equation 15

$$t_2-t_1=\log_\epsilon\left[\frac{E_1'}{E_2'}\right]^{R'C'} \qquad (18)$$

or:

$$t_2=t_1+\log_\epsilon\left[\frac{E_1'}{E_2'}\right]^{R'C'}=\log_\epsilon\left[\frac{E_0''}{E_1''}\right]+\log_\epsilon\left[\frac{E_1'}{E_2'}\right]^{R'C'} \qquad (19)$$

$$=\log_\epsilon\left(\left[\frac{E_0''}{E_1''}\right]^{R''C''}\left[\frac{E_1'}{E_2'}\right]^{R'C'}\right) \qquad (20)$$

Substituting Equation 20 into Equation 16:

$$E_2'''=E_0'''\epsilon^{-\frac{\log_\epsilon}{R'''C'''}\left(\left[\frac{E_0''}{E_1''}\right]^{R''C''}\left[\frac{E_1'}{E_2'}\right]^{R'C'}\right)} \qquad (21)$$

$$=E_0'''\frac{1}{\epsilon^{\log_\epsilon}\left(\left[\frac{E_0''}{E_1''}\right]^{\frac{R''C''}{R'''C'''}}\left[\frac{E_1'}{E_2'}\right]^{\frac{R'C'}{R'''C'''}}\right)} \qquad (22)$$

$$=E_0'''\frac{1}{\left[\frac{E_0''}{E_1''}\right]^{\frac{R''C''}{R'''C'''}}\left[\frac{E_1'}{E_2'}\right]^{\frac{R'C'}{R'''C'''}}} \qquad (23)$$

Thus, $$E_2'''=E_0'''\left[\frac{E_1''}{E_0''}\right]^{\frac{R''C''}{R'''C'''}}\left[\frac{E_2'}{E_1'}\right]^{\frac{R'C'}{R'''C'''}} \qquad (24)$$

Now if $R''C''=R'C'$ and if $R'C'/R'''C'''=n$, then:

$$E_2'''=E_0'''\left[\frac{E_1''E_2'}{E_0''E_1'}\right]^n \qquad (25)$$

which simplifies to Equation 4 if $(E_1''/E_0'')$ is made equal to 1, if $E_2'''$ is made equal to $E_2''$, and if $E_0'''$ is made equal to $E_1''$. Letting $n=1$, Equation 25 becomes:

$$E_2'''=E_0'''\frac{E_1''E_2'}{E_0''E_1'} \qquad (26)$$

and if $E_0'''$ is made equal to $E_0''$ $E_1'$, then:

$$E_2'''=E_1''E_2' \qquad (27)$$

which is a form of Equation 11 without any restrictions. Thus to multiply 5 by 8, let $E_1''=5$, $E_2=8$, $E_0''=E_1'=10$, $E_0'''=100$, and $$E_2'''=100\left[\frac{5\times8}{10\times10}\right]=40 \qquad (28)$$

In other words, $E_0'''$ will decay from 100 to 40 volts in the total time required for $E_0''$ to decay from 10 to 5 volts plus the time required for $E_1'$ to decay from 10 to 8 volts.

Figure 6:
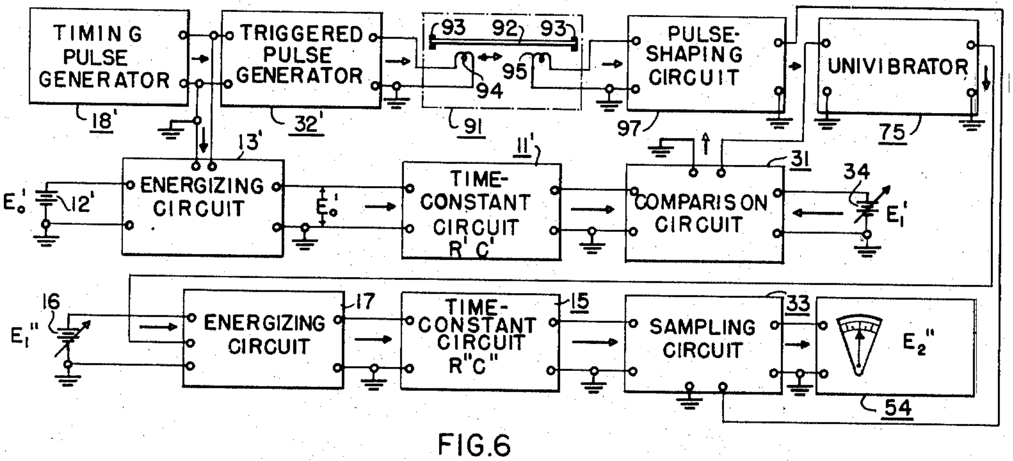

The block diagram of Fig. 6 represents another modified form of the invention essentially similar to that of Fig. 1. In the Fig. 6 arrangement, a source of a conveniently high initial voltage $E_0'$ provided by a battery 12' is applied to an energizing circuit 13' controlled from a timing-pulse generator 18' so as to energize a time-constant circuit R', C' in a unit 11'. Simultaneously the timing pulse from generator 18' is applied to a triggered pulse generator 32' to develop a pulse of short duration which is applied to an adjustable delay circuit 91. This delay circuit includes a rod or strip 92 of magnetostrictive material having energy-absorbing clamps 93, 93 at the ends thereof. The output circuit of the pulse generator 32' is coupled to a coil 94 magnetically coupled to the strip 92 and adjustable therealong. An output coil 95, also magnetically coupled to the strip 92, is coupled to the input circuit of a pulse-shaping circuit 97 of conventional construction. The input circuit of the pulse-shaping circuit 97 may include a source of biasing current for the output coil 95 as is desirable to obtain a desirable magnetic condition in the magnetostrictive strip 92 in the region of the output coil 95. Time-delay devices having a construction suitable for the unit 91 are described and claimed in the following copending applications: Alan Hazeltine, Serial No. 785,248, filed November 12, 1947, entitled "Magnetostrictive Signal-Translating Arrangement," now Patent No. 2,526,229; Theodore J. Fister, Serial No. 785,313, filed November 12, 1947, entitled "Magnetostrictive Converter," now abandoned; and Leslie F. Curtis, Serial No. 785,425, filed November 12, 1947, entitled "Magnetostrictive Time-Delay Device," now Patent No. 2,455,740, all assigned to the same assignee as the present invention.

Figure 7:
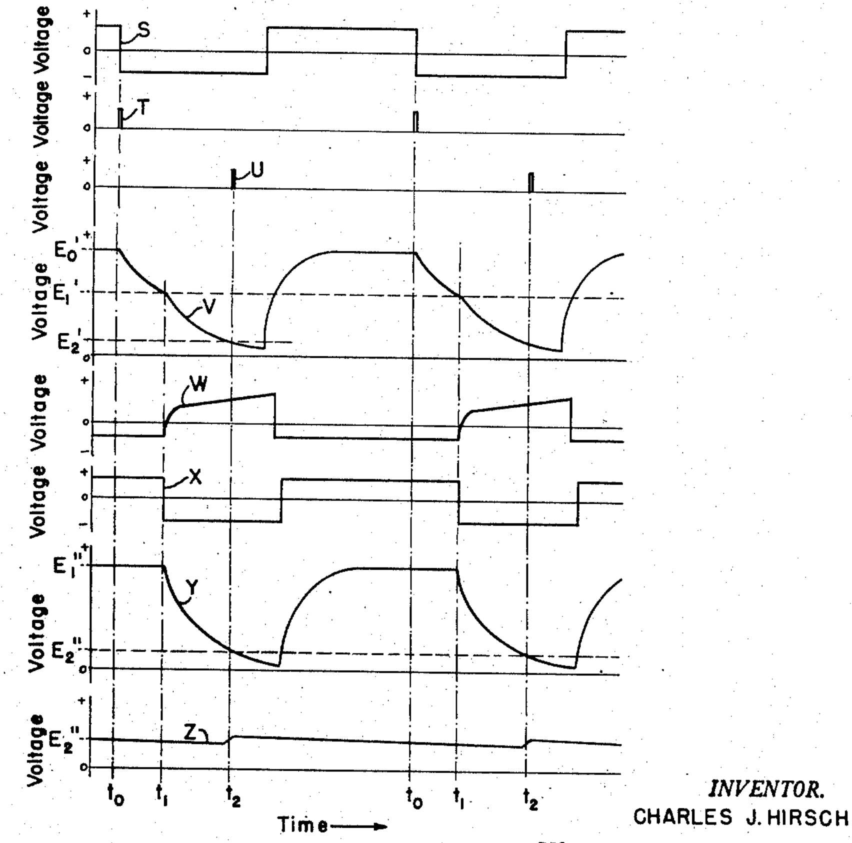

Referring to the curves of Fig. 7, the timing pulse of negative polarity developed in the generator 18' of Fig. 6 is represented by curve S. The leading edge of the negative timing pulse causes the generation at a time $t_0$ of a pulse of short duration in the pulse generator 32', as represented by curve T. This pulse is applied to the delay circuit 91 and emerges from said circuit at a time $t_2$ determined by the positioning of the coil 94 along the magnetostrictive strip 92. After wave-form correction in the pulse-shaping circuit 97, the delayed pulse induced in the coil 95 has the form represented by curve U and occurs at the time $t_2$.

Meanwhile the voltage of the circuit 11', represented by curve V, has been decaying from the value $E_0'$ at the time of energization $t_0$ to reach at a time $t_1$ the value $E_1'$ determined by the adjustment of an adjustable battery 34. The circuit 11' and the battery 34 are coupled to a comparison circuit 31', so that the latter develops a control pulse at the time $t_1$. This control pulse is represented by curve W of Fig. 7 and causes the generation of a pulse, represented by curve X, in a univibrator 75 to which the comparison circuit 31′ is coupled.

The leading edge of the pulse generated in the univibrator 75 energizes at the time $t_1$ the time-constant circuit R″, C″ in the unit 15, through the action of an energizing circuit 17 having an input circuit coupled to the univibrator 75 and an output circuit coupled to the circuit 15. A voltage $E_1''$ provided by an adjustable battery 16 is applied to another input circuit of the energizing circuit 17, so that the voltage in the circuit 15 at the time of its energization is $E_1''$. At the time $t_2$ the delayed pulse, curve U, of the pulse-shaping circuit 97 actuates a sampling circuit 33 coupled to the time-constant circuit 15 to derive therefrom a voltage $E_2''$, which is indicated on the voltmeter 54. The curve Y represents the voltage of the circuit 15, and the curve Z represents the voltage $E_2''$ derived in the sampling circuit 33.

At the time $t_2$ the voltage of the circuit 11′ has decayed to a value $E_2'$, assuming no disturbance in the circuit 11′ due to the action of the comparison circuit 31′ at the time $t_1$. With this assumption the voltage of the circuit 11′ has the values $E_1'$ and $E_2'$ at the times $t_1$ and $t_2$, respectively, while the voltage of the circuit 15 has the values $E_1''$ and $E_2''$ at the corresponding times. Therefore the relationship of Equation 4 applies to these four voltages. Assuming the time constants of the two circuits 11′ and 15 to be the same, the Equation 4 reduces to the form:

$$E_2''=\frac{E_1''E_2'}{E_1'} \qquad (29)$$

If the voltages $E_1''$ and $E_2'$ both remain unchanged during a series of computations, Equation 29 may be given the form:

$$E_2''=\frac{k}{E_1'} \qquad (30)$$

In such a case $E_1''$ may be preset by a suitable adjustment of the battery 16. In using the circuit arrangement of Fig. 6, however, it is not necessary to inject the voltage $E_2'$ into the circuit at all. Instead, the time interval $(t_2-t_0)$ is predetermined, either by calculation using an equation similar to Equation 1 with predetermined values of $E_0'$ and $E_2'$ or by measurement of a circuit the same as the circuit 11′ but without the possibly disturbing influence of a comparison circuit coupled thereto. If this time interval is determined by calculation, the voltage $E_2'$ may happen to occur at a point of the exponential discharge of the condenser C′ where the slope of curve V is relatively small so that the circuit would be insensitive to physical measurements at the time $t_2$. $E_0'$ is a voltage greater than any value which the voltage $E_1'$ may assume and, although arbitrary, must be maintained constant during successive computations because it affects the time interval $t_2-t_0$. A controlling pulse representing the internal $t_2-t_0$ is obtained in the Fig. 6 arrangement by the setting of the movable coil 94 of the delay circuit 91, which determines the time $t_2$ at which the pulse of curve U occurs. In this way the sampling circuit 33 of the Fig. 6 arrangement is made effectively responsive to a value $E_2'$ of the voltage in the circuit 11′ at time $t_2$, although this value is not used for control purposes.

If it is desired to solve with the present arrangement an equation of the form:

$$y=\frac{k}{x} \qquad (31)$$

the voltages $E_2''$ and $E_1'$ of Equation 30 may be used as representative of the parameters $y$ and $x$, respectively, of Equation 31. If the values of $E_1''$ and $E_2'$, Equations 29 and 30, are chosen so that the constant $k$ equals unity, then the Fig. 6 arrangement may be used to determine the reciprocal $y$ of the parameter $x$ of Equation 31.

Figure 8:
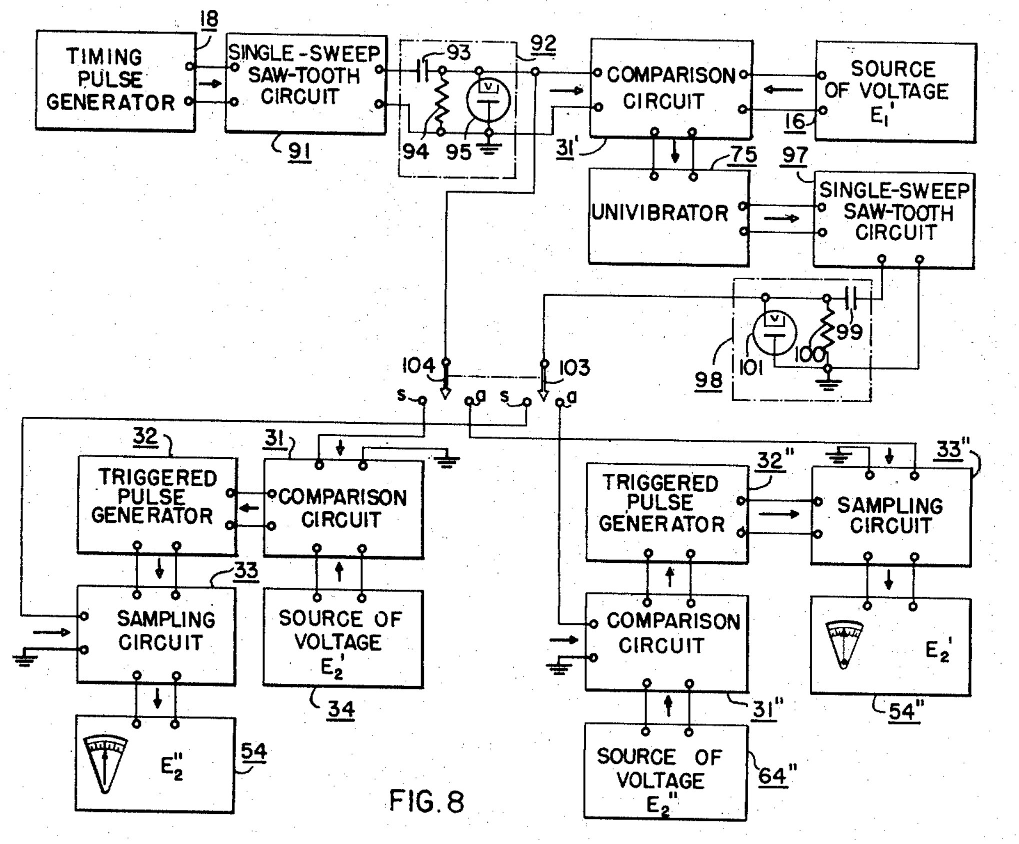

Fig. 8 is a circuit diagram, partly schematic, representing an embodiment of the invention useful for performing addition or subtraction. In this arrangement, all of the variables involved are represented by a voltage relative to ground which is proportional to the variable. A timing-pulse generator 18 triggers a single-sweep saw-tooth circuit 91 which produces a highly linear voltage wave of increasing magnitude starting at time $t_0$, as represented in the curve AA of Fig. 9. A zero-adjusting circuit 92 is included to provide for the initiation of the saw-tooth wave at zero voltage at the time $t_0$. This circuit comprises a coupling condenser 93 included in series with a resistor 94 across the output circuit of the unit 91, the resistor having coupled in shunt thereto a diode 95 having a grounded anode. A suitable single-sweep saw-tooth circuit is disclosed in "Principles of Radar," published by McGraw-Hill Publishing Co., Inc., New York, N. Y. (second edition, 1946) pages 3–20, Fig. 10.

Figure 9:
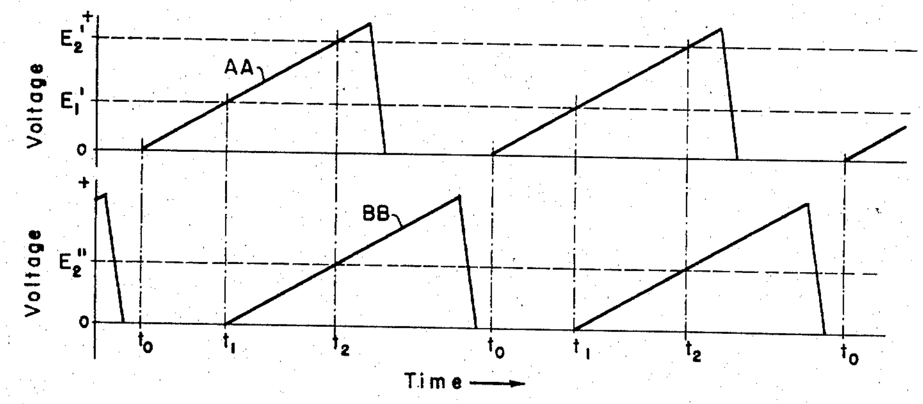
Figure 10:
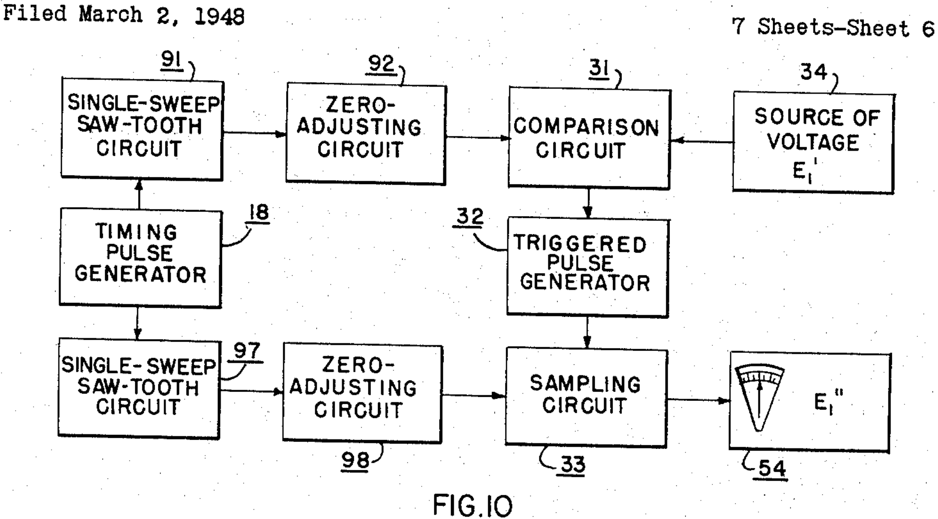
Figure 11:
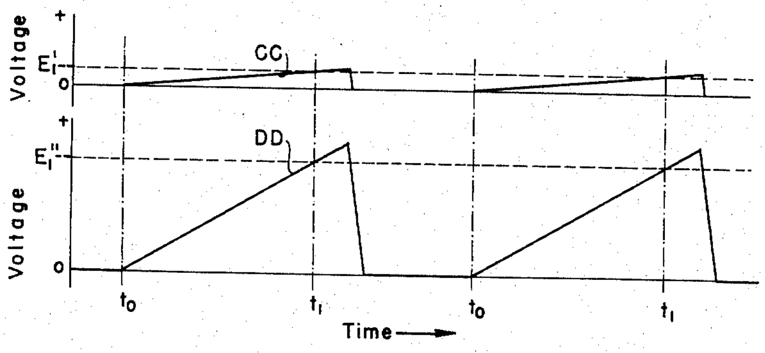

At a time $t_1$, the saw tooth represented by curve AA of Fig. 9 reaches a value $E_1'$ as determined by a source 16 of voltage $E_1'$. A comparison circuit 31′ then develops a potential pulse adapted to cause the generation of a potential pulse in a univibrator 75 having a wave form suitable for energizing another single-sweep saw-tooth circuit 97. The latter then develops a saw-tooth voltage starting at the time $t_1$ and represented by the curve BB of Fig. 9. Another zero-adjusting circuit 98 having a similar coupling condenser 99, resistor 100, and diode 101 provides a zero reference voltage for the saw-tooth wave of curve BB. The output circuit of the adjusting circuit 98 is connected to the switch blade of a single-pole double-throw switch 103, while the output circuit of the adjusting circuit 92 is coupled not only to the comparison circuit 31′ but also to the switch blade of a single-pole double-throw switch 104 operated in unicontrol with the switch 103.

When the switches 103 and 104 are in a position to contact their switch points $s$, the saw-tooth circuit 97 is coupled through the adjusting circuit 98 to a sampling circuit 33, to an output circuit of which is connected a voltmeter 54. The saw-tooth circuit 91 is coupled through the adjusting circuit 92 to a comparison circuit 31 controlled from a source 34 of voltage $E_2'$. When the saw-tooth potential represented by curve AA reaches the voltage $E_2'$, the comparison circuit 31 produces a potential pulse which is utilized to trigger a pulse generator 32 to produce a pulse suitable for actuating the sampling circuit 33. The latter then samples the voltage of the saw-tooth circuit 97 to derive the corresponding voltage $E_2''$ which is indicated by the voltmeter 54.

When the circuits 91 and 97 are so adjusted that the saw-tooth waves of voltage produced by them have the same slopes, the rate of increase of voltage in each of the saw-tooth circuits is the same, so that the increment of voltage in each of the circuits during the time interval from $t_1$ to $t_2$ is the same. Stated mathematically, this corresponds to the equation:

$$E_2''=E_2'-E_1' \qquad (32)$$

The values of the voltages in Equation 32 may represent the corresponding parameters of the equation:

$$z=x-y \qquad (33)$$

so that the Fig. 8 arrangement is useful to perform subtractions.

By moving the switches 103 and 104 to close their switch points $a$, the Fig. 8 arrangement is useful to perform additions. In this case, the voltage of the saw-tooth circuit 97 is compared in a comparison circuit 31'' with a voltage from a source 64'' of voltage $E_2''$ to determine the time $t_2$ by reference to the circuit 97 also as illustrated by the curves of Fig. 9. At the time $t_2$, the voltage of the saw-tooth circuit 97 reaches the voltage $E_2''$ and a poential pulse is developed in the comparison circuit 31'' to trigger a pulse generator 32'' which in turn actuates a sampling circuit 33''. The latter circuit is coupled to the saw-tooth circuit 91 through the adjusting circuit 92 to derive therefrom a voltage $E_2'$, which is the voltage present in the circuit 91 at the time $t_2$. This voltage is indicated on a voltmeter 54''.

Since the dependent variable in the circuit arrangement just described is the voltage $E_2'$ of the saw-tooth circuit 91, the Equation 32 may be rearranged in the form:

$$E_2'=E_1'+E_2'' \qquad (34)$$

The values of the voltages in Equation 34 may represent the parameters of the equation:

$$z=x+y \qquad (35)$$

Substantially linear time functions such as those developed in the saw-tooth circuits of the Fig. 8 arrangement also may be used for multiplying a number by a factor greater or less than unity. An arrangement of this type is represented by the block diagram of Fig. 10 and the curves of Fig. 11. A timing-pulse generator 18 causes the initiation at a time $t_0$ of a substantially linear saw-tooth wave of voltage in a reference saw-tooth circuit 91 provided with a zero-adjusting circuit 92. Simultaneously with the initiation of this saw-tooth wave of voltage, another saw-tooth wave of voltage is initiated by the same timing pulse in a similar saw-tooth circuit 97 provided with a zero-adjusting circuit 98. The wave forms of the voltages developed in the two circuits 92 and 98 are represented by the curves CC and DD, respectively, of Fig. 11. The adjusting circuit 92 is coupled to a comparison circuit 31 controlled by a source 34 of voltage $E_1'$. When the voltage of the circuit 91 reaches the voltage $E_1'$, at a time which may be designated $t_1$, the comparison circuit 31 triggers a pulse generator 32 to develop a potential pulse suitable for actuating a sampling circuit 33 to which the adjusting circuit 98 is coupled. Thus, the voltage $E_1''$ then present in the saw-tooth circuit 97 is derived in the sampling circuit 33 and may be indicated on a voltmeter 54.

The voltage developed in the saw-tooth circuit 91 and its adjusting circuit 92 may be expressed by the equation:

$$E'=k't \qquad (36)$$

Similarly the voltage developed in the saw-tooth circuit 97 and its adjusting circuit 98 may be expressed by the equation:

$$E''=k''t=\frac{k''}{k'}E' \qquad (37)$$

The values E'', $$\frac{k''}{k'}$$

and E' may represent the parameters of the equation:

$$x=ay \qquad (38)$$

An arrangement of this type may be used, for example, to multiply the parameter $y$ by any convenient constant $a$ such as 10. Thus if a computer of the type described is used to solve an equation represented by the voltages of Equation 10 hereinabove, and the range of voltages over which the voltage $E_2'$ in that equation may vary is such that the voltage $E_2'$ is always quite small, this voltage may be multiplied by any constant such as 10 by using a computer of the Fig. 10 type. The resulting voltage is then applied as a source of voltage $E_2'$ of the next higher order of magnitude to the computer for performing multiplication, as in computation involving an equation of the type represented by Equation 11. The product $z$ read from the computer then must be divided by the constant $a$ employed, for example 10, to obtain the correct solution. The Fig. 10 arrangement has the advantage of a fixed accuracy no matter when the time $t_1$ occurs along the saw tooth, and may be made to multiply or divide by large factors because of the linearity of the circuits available for generating voltages of saw-tooth wave form. Since the amplitudes of the saw-tooth wave form increase rather than decrease with time, the only limit to the voltages which may be measured is imposed by the duration of the saw-tooth wave of voltage itself.

Figure 12:
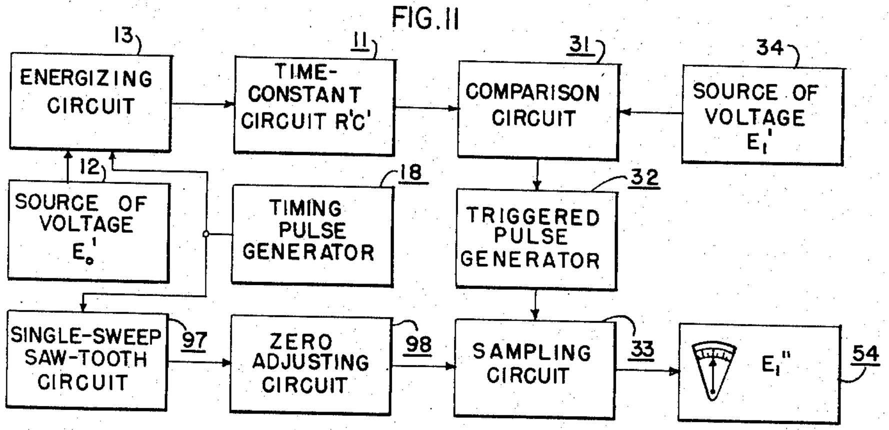
Figure 13:
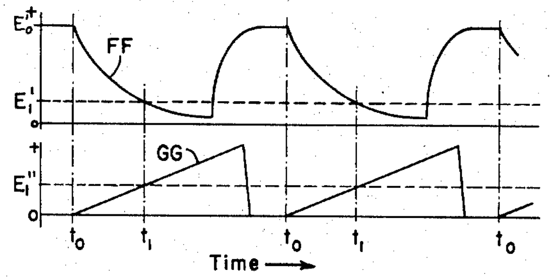

In the embodiment of the invention represented by the block diagram of Fig. 12, one of the computation effects, specifically the effect developed by the reference circuit, varies as a time function analogous to an equation to be solved. A timing-pulse generator 18 causes the energization of both a single-sweep saw-tooth circuit 97 and, through an energizing circuit 13, the time-constant circuit R', C' of a unit 11. Both of the units 11 and 97 are energized at a time which is indicated $t_0$ in the explanatory curves of Fig. 13. Prior to the time $t_0$ the circuit 11 has been charged to a voltage $E_0'$ as determined by the adjustment of a source 12 of such a voltage. The resulting exponentially decaying voltage in the circuit 11 is represented by curve FF of Fig. 13, while the saw-tooth circuit 97 is provided with a zero-adjusting circuit 98 which develops a voltage represented by curve GG of Fig. 13. When the voltage of the circuit 11 reaches a value $E_1'$, as determined by a source 34 of voltage $E_1'$, a comparison circuit 31 develops a potential pulse adapted to trigger a pulse generator 32 which in turn provides a potential pulse for actuating a sampling circuit 33 having an input circuit coupled to the adjusting circuit 98. If the circuit 11 reaches the voltage $E_1'$ at a time $t_1$, the voltage $E_1''$ in the adjusting circuit 98 is derived at that time in the sampling circuit 33 and is indicated on the voltmeter 54.

To illustrate the use of the Fig. 12 arrangement, let it be assumed that it is required to solve an equation of the form:

$$y=a\epsilon^{-\frac{x}{b}} \qquad (39)$$

The voltage developed in the time-constant circuit 11 is given by the expression:

$$E'=E_0'\epsilon^{-\frac{t}{R'C'}} \qquad (40)$$

The voltage developed by the saw-tooth circuit 97 and its zero-adjusting circuit 98 may be expressed by the relation:

$$E''=k''t \quad (41)$$

Substituting Equation 41 in Equation 40, there is obtained the equation:

$$E'=E_0'\epsilon^{-\frac{E''}{k''R'C'}} \quad (42)$$

The values of the terms E', $E_0'$, E'', and (k''R'C') in Equation 42 may represent respectively the parameters $y$, $a$, $x$ and $b$ of Equation 39.

Inserting specific values of the dependent-variable parameter $x$ and the independent-variable parameter $y$ in Equation 42, it takes the form:

$$E_1'=E_0'\epsilon^{-\frac{E_1''}{k''R'C'}} \quad (43)$$

Equation 43 may be transformed into the form:

$$\epsilon^{+\frac{E_1''}{k''R'C'}}=\frac{E_0'}{E_1'} \quad (44)$$

which in turn may take the form:

$$\frac{E_1''}{k''R'C'}=\log_\epsilon\frac{E_0'}{E_1'} \quad (45)$$

If the source 34, Fig. 12, is adjusted to give a voltage $E_1'$ equal to unity, Equation 45 becomes:

$$E_1''=C\log_\epsilon E_0' \quad (46)$$

where $$C=k''R'C' \quad (47)$$

If the circuit constants of the circuits 11 and 97 are chosen so that C equals unity, the voltage $E_1''$ represents the natural logarithm of the voltage $E_0'$. If the constant C of Equation 46 is made equal to $\log_b \epsilon$, then:

$$E_1''=(\log_b \epsilon)(\log_\epsilon E_0')=\log_b E_0' \quad (48)$$

where $b$ is any suitable base such as the base 10 of the common logarithms. By reversing the positions of the time-constant circuit 11 and the saw-tooth circuit 97, 98 with respect to the comparison circuit 31 and sampling circuit 33, the voltage $E_1''$ may be made to represent the dependent variable and the voltage $E_1$ to represent the independent variable, so that Equation 48 takes the form:

$$E_1'=\text{antilog}_b\, E_1'' \quad (49)$$

Thus the Fig. 12 arrangement may be used for finding logarithms and antilogarithms to any desired base.

Figure 14:
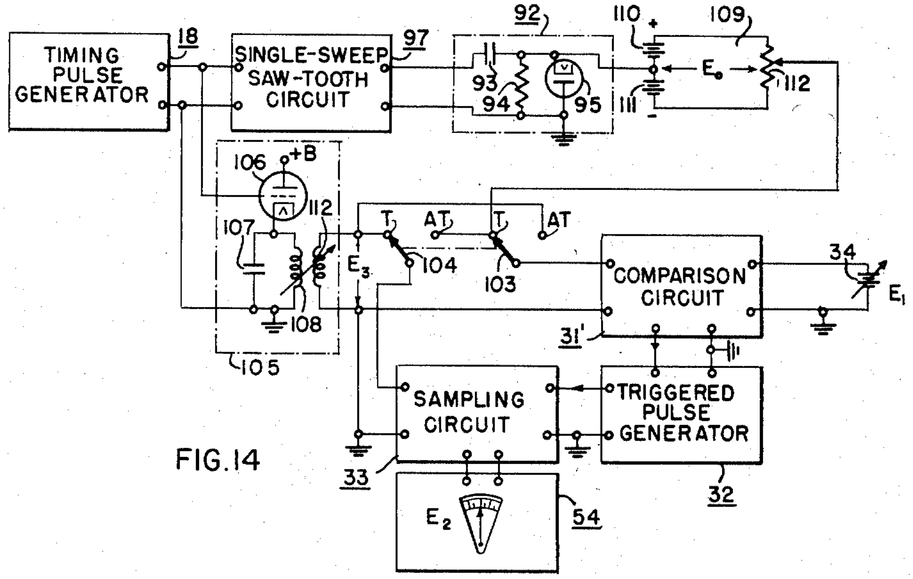

The arrangement of Fig. 14 is useful to solve an equation of the form:

$$y=\sin(x\pm\theta) \quad (50)$$

or, conversely:

$$x=\theta\pm\sin^{-1}y \quad (51)$$

In the Fig. 14 arrangement, the timing-pulse generator 18 is coupled through a single-sweep saw-tooth circuit 97 to a zero-adjusting circuit 92. The output circuit of the latter is coupled to a phase-control circuit 109 which includes a voltage divider 112 connected across serially arranged sources of unidirectional potential shown as batteries 110 and 111, the junction of the batteries being coupled to the cathode of the diode rectifier 95 included in the zero-adjusting circuit 92. The movable contact arm of the potential divider 112 is connected to a fixed contact T of a single-pole double-throw switch 103 and also to a fixed contact AT of a single-pole double-throw switch 104. The switch blade of the switch 103 is coupled to the input circuit of a comparison circuit 31', while the switch blade of the switch 104 is coupled to the input circuit of a sampling circuit 33.

The output circuit of the timing-pulse generator 18 is also coupled to a sine-wave ringing generator 105 which includes a triode vacuum tube 106 having an anode electrode coupled to a source of energizing potential, indicated as +B, and a cathode electrode coupled to ground through a parallel-resonant circuit comprising an inductor 108 and a shunt-connected condenser 107. An inductor 112 is adjustably coupled to the inductor 108, and may be selectively coupled through a fixed switch contact T of the switch 104 to the input circuit of the sampling circuit 33 or through a fixed switch contact AT of the switch 103 to the input circuit of the comparison circuit 31'.

Figure 15:
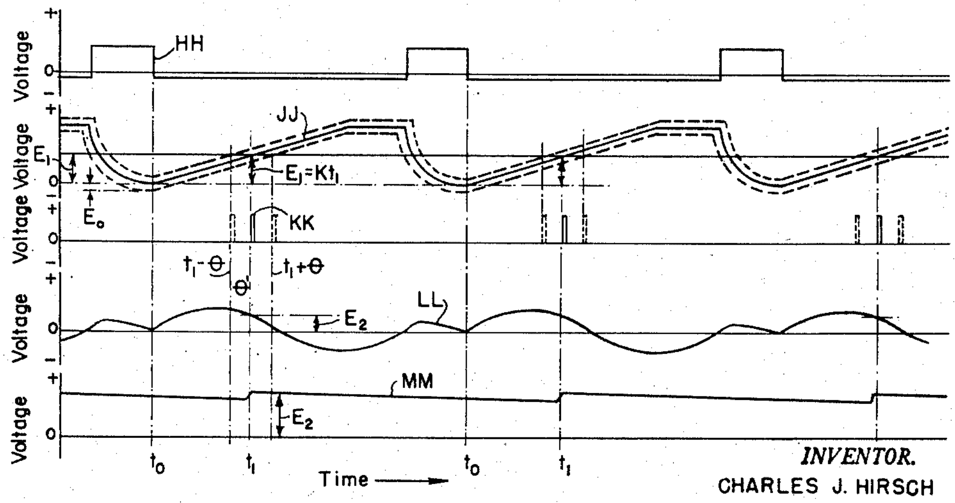

Considering now the operation of the arrangement just described, and referring to the curves of Fig. 15, the signal of periodic-pulse wave form generated by the generator 18 and represented by curve HH is applied to the saw-tooth circuit 97 to initiate a signal of saw-tooth wave form represented by curve JJ. Upon translating this signal through the zero-adjusting circuit 92 and the phase-control circuit 109, there is added to the signal a voltage $E_0$ which is adjustable in magnitude and polarity with adjustment of the potential divider 112 so that the voltage applied to the switch contacts T and AT of the respective switches 103 and 104 may have an amplitude range as indicated by the broken-line curves associated with curve JJ.

The signal of periodic-pulse wave form generated by the generator 18 is also applied to the sine-wave ringing generator 105. The vacuum tube 106 is biased to anode-current cutoff at the trailing edge of each pulse. The consequent sudden conduction of space current through the tube 106 shocks the inductor 108 and condenser 107 into oscillation at the frequency:

$$f=\frac{1}{2\pi\sqrt{LC}} \quad (52)$$

where $L$=the value of inductance of the inductor 108
$C$=the value of capacitance of the condenser 107.

The oscillations thus developed in the resonant circuit 107, 108 are represented by curve LL and are coupled into the inductor 112 with a magnitude dependent upon the value of inductive coupling between the inductors 108 and 112, and the oscillations induced in the inductor 112 are applied to the switch contacts T and AT of the respective switches 104 and 103.

In solving an equation of the form represented by Equation 50, the switches 103 and 104 are moved to close their contacts T so that the phase-adjusting circuit 109 is coupled to the comparison circuit 31' and the inductor 112 is coupled to the sampling circuit 33. When the voltage translated through the phase-control circuit 109 equals the voltage $E_1$ at time $t_1$, or equals $E_1 \pm E_0$ at the time $t_1 \pm \theta$, the triggered pulse generator 32 generates a pulse of short duration as represented by the curve KK. This generated pulse operates the sampling circuit 33 to deliver to the voltmeter 54 the voltage applied to the input circuit of the unit 33 from the inductor 112. Meanwhile, the sine-wave generator 105 initiates the generation at time $t_0$ of oscillations in its resonant circuit 107, 108. The voltage thus applied to the sampling circuit 33 at any time $t$ is therefore given by the relation:

$$E_2=E_3' \sin 2\pi ft \qquad (53)$$

However, the time $t$ is determined by the linear saw-tooth voltage appearing at the terminal T of the switch 103 when this voltage was equal to $E_1$, so that the time $t$ is given by the relation:

$$E_1=Kt_1\pm E_0 \qquad (54)$$

where $K$=the slope of the linear saw-tooth voltage generated by the unit 97.

The value of the time $t_1$ is thus seen from Equation 54 to have the value:

$$t_1=\frac{E_1\mp E_0}{K} \qquad (55)$$

When this value $t_1$ is substituted in Equation 53, the voltage sampled by the sampling circuit 33 is given by the relation:

$$E_2=E_3' \sin \frac{2\pi f(E_1\mp E_0)}{K} \qquad (56)$$

If in Equation 56 the voltage $E_3'$ and the term $2\pi f/K$ are each made equal to unity, Equation 56 becomes:

$$E_2=\sin (E_1\mp E_0) \qquad (57)$$

which is of the form:

$$y=\sin (x\mp\theta) \qquad (58)$$

by letting $y=E_2$; $x=E_1$; and $\theta=E_0$. The voltage $E_2$ thus measured by the voltmeter 54 is represented in Fig. 15 by the curve MM.

Assume now that the switches 103 and 104 are moved to close their contacts AT. The comparison circuit 31' now operates at the moment when the oscillatory voltage applied thereto from the inductor 112 is equal to the voltage $E_1$, and the sampling circuit 33 measures at that time the value of the saw-tooth voltage applied to the latter from the phase-adjusting circuit 109. In this case, we obtain from Equation 53 the value of the time $t_1$ when $E_3'$ is equal to $E_2$ as follows:

$$t_1=\frac{1}{2\pi f} \sin^{-1} E_2/E_2' \qquad (59)$$

which when substituted into Equation 54 becomes:

$$E_1=\frac{K}{2\pi f} \sin^{-1} E_2/E_3'\mp E_0 \qquad (60)$$

and by making $K/2\pi f$ and $E_3'$ each equal to unity, Equation 60 becomes of the form:

$$x=\theta\pm\sin^{-1}y \qquad (61)$$

by making $x=E_1$; $\theta=E_0$ and $y=E_2$.

It will be apparent from the above description of the invention that an electrical computer involving the invention is applicable generally to solving equations the solutions of which involve the common mathematical relationships and yet is one free of mechanical moving parts, is compact and of small weight, and is capable of computation at high speeds. The computer of the invention is capable of continuously and rapidly recalculating a problem involving parameters subject to change, and is well adapted to perform algebraic operations in which all of the independent and dependent variables are represented by voltages referred to a conventional reference datum voltage.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electrical computer for solving equations involving known and unknown parameters comprising: an electrical reference circuit having circuit elements with resistance and reactance values so proportioned as to develop an electrical effect varying as a predetermined time function the value of which at some time represents a known parameter of an equation to be solved; a source of potential having a value representative of a parameter of said equation; means for utilizing said potential of said source and said effect at said predetermined time to develop a control effect; an electrical controlled circuit having circuit elements with resistance and reactance values so proportioned as to develop another electrical effect having a value electrically independent of the value of said first-mentioned effect and varying as a predetermined time function a value of which at some time is related to the value of an unknown parameter of said equation; means responsive to said control effect for evaluating said other effect to derive a resultant effect which represents an unknown parameter of said equation; and means for utilizing said resultant effect.

2. An electrical computer for solving equations involving known and unknown parameters comprising: an electrical reference circuit having circuit elements with resistance and reactance values so proportioned as to develop an electrical effect varying as a predetermined time function which at an instant of time determined by an independent variable known parameter of an equation to be solved reaches a value representing said known parameter; a source of potential having a value representative of said independent variable known parameter; means for utilizing said potential of said source and said effect at said predetermined time to develop a control effect; an electrical controlled circuit having circuit elements with resistance and reactance values so proportioned as to develop another electrical effect having a value electrically independent of the value of said first-mentioned effect and varying as a predetermined time function a value of which at some time is related to the value of an unknown parameter of said equation; means responsive to said control effect for evaluating said other effect to derive a resultant effect which represents an unknown parameter of said equation; and means for utilizing said resultant effect.

3. An electrical computer for solving equations involving known and unknown parameters comprising: an electrical reference circuit having circuit elements with resistance and reactance values so proportioned as to develop an electrical effect varying as a predetermined time function the value of which at some time represents a known parameter of an equation to be solved; a source of potential having a value representative of a parameter of said equation; means for utilizing said potential of said source and said effect at said predetermined time to develop a control effect; an electrical controlled circuit having circuit elements with resistance and reactance values so proportioned as to develop another electrical effect having a value electrically independent of the value of said first-mentioned effect and varying as a predetermined time function a value of which at some time is related to the value of an unknown parameter of said equation, at least one of said effects varying as a time function analogous to the equation to be solved; means responsive to said control effect for evaluating said other effect to derive a resultant effect which represents an unknown parameter of said equation; and means for utilizing said resultant effect.

4. An electrical computer for solving equations involving known and unknown parameters comprising: a first impedance network having circuit elements with resistance and reactance values so proportioned as to develop an electrical effect varying as a predetermined time function the value of which at some time represents a known parameter of an equation to be solved; a source of potential having a value representative of a parameter of said equation; means for utilizing said potential of said source and said effect at said predetermined time to develop a control effect; a second impedance network having circuit elements with resistance and reactance values so proportioned as to develop another electrical effect having a value electrically independent of the value of said first-mentioned effect and varying as a predetermined time function a value of which at some time is related to the value of an unknown parameter of said equation, at least one of said functions varying as a substantially linear function of time; means responsive to said control effect for evaluating said other effect to derive a resultant effect which represents an unknown parameter of said equation; and means for utilizing said resultant effect.

5. An electrical computer for solving equations involving known and unknown parameters comprising: an electrical reference circuit having circuit elements with resistance and reactance values so proportioned as to develop an electrical effect varying as a predetermined substantially linear time function the value of which at some time represents a known parameter of an equation to be solved; a source of potential having a value representative of a parameter of said equation; a signal-comparison circuit for combining said potential of said source and said effect at said predetermined time to develop a control effect; an electrical controlled circuit having circuit elements with resistance and reactance values so proportioned as to develop another electrical effect having a value electrically independent of the value of said first-mentioned effect and varying as a predetermined substantially linear time function a value of which at some time is related to the value of an unknown parameter of said equation; means responsive to said control effect for evaluating said other effect to derive a resultant effect which represents an unknown parameter of said equation; and means for utilizing said resultant effect.

6. An electrical computer for solving equations involving known and unknown parameters comprising: an electrical reference circuit having circuit elements with resistance and reactance values so proportioned as to develop an electrical effect varying as a predetermined time function the value of which at some time represents a known parameter of an equation to be solved; a source of potential having a value representative of a parameter of said equation; means coupled to said reference circuit and said source for utilizing said potential of said source and said effect at said predetermined time to develop a control effect; an electrical controlled circuit having circuit elements with resistance and reactance values so proportioned as to develop another electrical effect having a value electrically independent of the value of said first-mentioned effect and varying as a predetermined time function a value of which at some time is related to the value of an unknown parameter of said equation, at least one of said effects varying as a trigonometric function of time; means responsive to said control effect for evaluating said other effect to derive a resultant effect which represents an unknown parameter of said equation; and means for utilizing said resultant effect.

7. An electrical computer for solving equations involving known and unknown parameters comprising: a first time-constant circuit having circuit elements with resistance and reactance values so proportioned as to develop an electrical effect varying as a predetermined time function the value of which at some time represents a known parameter of an equation to be solved; a source of potential having a value representative of a parameter of said equation; an electron-discharge device for comparing said potential of said source and said effect at said predetermined time to develop a control effect; a second time-constant circuit having circuit elements with resistance and reactance values so proportioned as to develop another electrical effect having a value electrically independent of the value of said first-mentioned effect and varying as a predetermined time function a value of which at some time is related to the value of an unknown parameter of said equation, at least one of said effects varying as an exponential function of time; means responsive to said control effect for evaluating said other effect to derive a resultant effect which represents an unknown parameter of said equation; and means for utilizing said resultant effect.

8. An electrical computer for solving equations involving known and unknown parameters comprising: a first adjustable time-constant circuit having circuit elements with resistance and reactance values so proportioned as to develop an electrical effect varying as a predetermined time function the value of which at some time represents a known parameter of an equation to be solved; a source of potential having a value representative of a parameter of said equation; means for utilizing said potential of said source and said effect at said predetermined time to develop a control effect; a second adjustable time-constant circuit having circuit elements with resistance and reactance values so proportioned as to develop another electrical effect having a value electrically independent of the value of said first-mentioned effect and varying as a predetermined time function a value of which at some time is related to the value of an unknown parameter of said equation, at least one of said effects varying as an exponentially decaying function of time; means responsive to said control effect for evaluating said other effect to derive a resultant effect which represents an unknown parameter of said equation; and means for utilizing said resultant effect.

9. An electrical computer for solving equations involving known and unknown parameters comprising: an electrical reference circuit having circuit elements with resistance and reactance values so proportioned as to develop an electrical effect varying as a predetermined exponential time function the value of which at some time represents a known parameter of an equation to be solved; a source of potential having a value representative of a parameter of said equation;

means for utilizing said potential of said source and said effect at said predetermined time to develop a control effect; an electrical controlled circuit having circuit elements with resistance and reactance values so proportioned as to develop another electrical effect having a value electrically independent of the value of said first-mentioned effect and varying as a predetermined exponential time function a value of which at some time is related to the value of an unknown parameter of said equation; means responsive to said control effect for evaluating said other effect to derive a resultant effect which represents an unknown parameter of said equation; and means for utilizing said resultant effect.

10. An electrical computer for solving equations involving known and unknown parameters comprising: an electrical reference circuit having circuit elements with resistance and reactance values so proportioned as to develop an electrical effect varying as a predetermined exponential decaying time function the value of which at some time represents a known parameter of an equation to be solved; a source of potential having a value representative of a parameter of said equation; means for utilizing said potential of said source and said effect at said predetermined time to develop a control effect; an electrical controlled circuit having circuit elements with resistance and reactance values so proportioned as to develop another electrical effect having a value electrically independent of the value of said first-mentioned effect and varying as a predetermined exponential decaying time function a value of which at some time is related to the value of an unknown parameter of said equation; means responsive to said control effect for evaluating said other effect to derive a resultant effect which represents an unknown parameter of said equation; and means for utilizing said resultant effect.

11. An electrical computer for solving equations involving known and unknown parameters comprising: an electrical reference circuit having circuit elements with resistance and reactance values so proportioned as to develop an electrical effect varying as a predetermined time function the value of which at some time represents a known parameter of an equation to be solved; a source of potential having a value representative of a parameter of said equation; means for utilizing said potential of said source and said effect at said predetermined time to develop a control effect; an electrical controlled circuit having circuit elements with resistance and reactance values so proportioned as to develop another electrical effect having a value electrically independent of the value of said first-mentioned effect and varying as a predetermined time function a value of which at some time is related to the value of an unknown parameter of said equation, at least one of said circuits being an energy-storage network; means responsive to said control effect for evaluating said other effect to derive a resultant effect which represents an unknown parameter of said equation; and means for utilizing said resultant effect.

12. An electrical computer for solving equations involving known and unknown parameters comprising: an electrical reference energy-storage network having circuit elements with resistance and reactance values so proportioned as to develop an electrical effect varying as a predetermined exponentially decaying time function the value of which at some time represents a known parameter of an equation to be solved; a source of potential having a value representative of a parameter of said equation; means for utilizing said potential of said source and said effect at said predetermined time to develop a control effect; an electrical controlled energy-storage network having circuit elements with resistance and reactance values so proportioned as to develop another electrical effect having a value electrically independent of the value of said first-mentioned effect and varying as a predetermined exponentially decaying time function a value of which at some time is related to the value of an unknown parameter of said equation; means responsive to said control effect for evaluating said other effect to derive a resultant effect which represents an unknown parameter of said equation; and means for utilizing said resultant effect.

13. An electrical computer for solving equations involving known and unknown parameters comprising: an electrical reference circuit having circuit elements with resistance and reactance values so proportioned as to develop upon energization an electrical effect varying as a predetermined time function the value of which at some time after said energization represents a known parameter of an equation to be solved; a source of potential having a value representative of a parameter of said equation; means for utilizing said potential of said source and said effect at said predetermined time to develop a control effect; an electrical controlled circuit having circuit elements with resistance and reactance values so proportioned as to develop upon energization thereof at a time related to the time of said energization of said reference circuit another electrical effect having a value electrically independent of the value of said first-mentioned effect and varying as a predetermined time function a value of which at some time is related to the value of an unknown parameter of said equation; means responsive to said control effect for evaluating said other effect to derive a resultant effect which represents an unknown parameter of said equation; and means for utilizing said resultant effect.

14. An electrical computer for solving equations involving known and unknown parameters comprising: an electrical reference circuit having circuit elements with resistance and reactance values so proportioned as to develop upon energization an electrical effect varying as a predetermined time function the value of which at some time after said energization represents a known parameter of an equation to be solved; means for repeatedly energizing said reference circuit; a source of potential having a value representative of a parameter of said equation; means for utilizing said potential of said source and said effect at said predetermined time after each of said repeated energizations to develop a control effect; an electrical controlled circuit having circuit elements with resistance and reactance values so proportioned as to develop upon each similarly repeated energization thereof another electrical effect having a value electrically independent of the value of said first-mentioned effect and varying as a predetermined time function a value of which at some time is related to the value of an unknown parameter of said equation; means responsive to each of said control effects for evaluating said other effect to derive a resultant effect which represents an unknown parameter of said equation; and means for utilizing said resultant effect.

15. An electrical computer for solving equations involving known and unknown parameters comprising: an electrical reference circuit having circuit elements with resistance and reactance values so proportioned as to develop upon energization an electrical effect varying as a predetermined time function which, at an instant of time after said energization as determined by an independent variable known parameter of an equation to be solved, reaches a value representing said known parameter; means for repeatedly energizing said reference circuit; a source of potential having a value representative of a parameter of said equation; means for utilizing said potential of said source and said effect at said predetermined time after each of said repeated energizations to develop a control effect; an electrical controlled circuit having circuit elements with resistance and reactance values so proportioned as to develop upon each similarly repeated energization thereof another electrical effect having a value electrically independent of the value of said first-mentioned effect and varying as a predetermined time function a value of which at some time is related to the value of an unknown parameter of said equation variable with variations of said independent variable known parameter; means responsive to each of said control effects for evaluating said other effect to derive a resultant effect which represents an unknown parameter of said equation; and means for utilizing said resultant effect.

16. An electrical computer for solving equations involving known and unknown parameters comprising: a plurality of electrical circuits each with resistance and reactance values so proportioned as to develop upon energization a measurable electrical effect having a value which is a predetermined function of time, said known and unknown parameters being represented by values assumed by the time functions of said effects at related times; means for energizing at least one of said circuits to produce at least one of said effects; a source of potential having a value representative of a known parameter of said equation for determining a first instant of time at which the value of the effect produced by said one circuit represents one of said known parameters; means for utilizing said potential of said source and one of said effects at said first instant of time to develop a control effect; said energizing means also being so proportioned as to initiate energization of at least one other of said circuits at a time related to said first instant of time to produce at least another of said electrical effects having a value independent of the value of said one of said effects; means effectively responsive to said control effect for determining a second instant of time at which the value of another of said effects represents an unknown parameter; and means for utilizing said other effect representative of said unknown parameter.

17. An electrical computer for solving equations involving known and unknown parameters comprising: a plurality of electrical circuits each with resistance and reactance values so proportioned as to develop upon energization a measurable electrical effect having a value which is a predetermined function of time, at least one of said effects having a value varying as a substantially linear function of time and said known and unknown parameters being represented by values assumed by the time functions of said effects at related times; means for energizing at least one of said circuits to produce at least one of said effects; a source of potential having a value representative of a known parameter of said equation for determining a first instant of time at which the value of the effect produced by said one circuit represents one of said known parameters; means for utilizing said potential of said source and one of said effects at said first instant of time to develop a control effect; said energizing means also being so proportioned as to initiate energization of at least one other of said circuits at a time related to said first instant of time to produce at least another of said electrical effects having a value independent of the value of said one of said effects; means effectively responsive to said control effect for determining a second instant of time at which the value of another of said effects represents an unknown parameter; and means for utilizing said other effect representative of said unknown parameter.

18. An electrical computer for solving equations involving known and unknown parameters comprising: a plurality of electrical circuits each with resistance and reactance values so proportioned as to develop upon energization of measurable electrical effect having a value which is a predetermined function of time, at least one of said effects having a value varying as a trigonometric function of time and said known and unknown parameters being represented by values assumed by the time functions of said effects at related times; means for energizing at least one of said circuits to produce at least one of said effects; a source of potential having a value representative of a known parameter of said equation for determining a first instant of time at which the value of the effect produced by said one circuit represents one of said known parameters; means for utilizing said potential of said source and one of said effects at said first instant of time to develop a control effect; said energizing means also being so proportioned as to initiate energization of at least one other of said circuits at a time related to said first instant of time to produce at least another of said electrical effects having a value independent of the value of said one of said effects; means effectively responsive to said control effect for determining a second instant of time at which the value of another of said effects represents an unknown parameter; and means for utilizing said other effect representative of said unknown parameter.

19. An electrical computer for solving equations involving known and unknown parameters comprising: a plurality of electrical circuits each with resistance and reactance values so proportioned as to develop upon energization a measurable electrical effect having a value which is a predetermined function of time, at least one of said effects having a value varying as an exponential function of time and said known and unknown parameters being represented by values assumed by the time functions of said effects at related times; means for energizing at least one of said circuits to produce at least one of said effects; a source of potential having a value representative of a known parameter of said equation for determining a first instant of time at which the value of the effect produced by said one circuit represents one of said known parameters; means for utilizing said potential of said source and one of said effects at said first instant of time to develop a control effect; said energizing means also being so proportioned as to initiate energization of at least one other of said circuits at a time related to said first instant of time to produce at least another of said electrical effects having a value independent of the value of said one of said effects; means effectively responsive to said control effect for determining a second instant of time at which the value of another of said effects represents an unknown parameter; and means for utilizing said other effect representative of said unknown parameter.

20. An electrical computer for solving equations involving known and unknown parameters comprising: a plurality of electrical energy-storage networks each with resistance and reactance values so proportioned as to develop upon energization a measurable electrical effect having a value which is a predetermined exponential function of time, said known and unknown parameters being represented by values assumed by the time functions of said effects at related times; means for energizing at least one of said networks to produce at least one of said effects; a source of potential having a value representative of a known parameter of said equation for determining a first instant of time at which the value of the effect produced in said one network represents one of said known parameters; means for utilizing said potential of said source and one of said effects at said first instant of time to develop a control effect; said energizing means also being so proportioned as to initiate energization of at least one other of said networks at a time related to said first instant of time to produce at least another of said electrical effects having a value independent of the value of said one of said effects; means effectively responsive to said control effect for determining a second instant of time at which the value of another of said effects represents an unknown parameter; and means for utilizing said other effect representative of said unknown parameter.

CHARLES JOACHIM HIRSCH.

References Cited in the file of this patent

UNITED STATES PATENTS

| Number | Name | Date |
|---|---|---|
| 2,313,666 | Peterson | Mar. 9, 1943 |
| 2,401,729 | Goldsmith | June 11, 1946 |
| 2,403,873 | Mumma | July 9, 1946 |
| 2,422,698 | Miller | June 24, 1947 |
| 2,433,254 | Aiken | Dec. 23, 1947 |